United States Patent [19]
Kabisch et al.

[11] 3,761,581
[45] Sept. 25, 1973

[54] PROCESS FOR THE PRODUCTION OF HYDROGEN PEROXIDE

[75] Inventors: Gerhard Kabisch; Rudolf Trube, both of Rheinfelden, Germany

[73] Assignee: Deutsch Gold-und Silber-Scheideanstalt vormals Roessler, Frankfurt, Germany

[22] Filed: Sept. 2, 1970

[21] Appl. No.: 69,151

[30] Foreign Application Priority Data
Sept. 10, 1969 Germany .................. P 19 45 705.2

[52] U.S. Cl. .............................. 423/589, 260/369
[51] Int. Cl. ..................... C01b 15/02, C07c 49/68
[58] Field of Search ..................... 23/207; 260/369; 423/588, 589

[56] References Cited
UNITED STATES PATENTS

| | | | |
|---|---|---|---|
| 2,993,760 | 8/1961 | Brown, Jr. et al. | 423/588 |
| 2,537,655 | 1/1951 | Dawsey et al. | 23/207 |
| 3,328,128 | 6/1967 | Kabisch | 260/369 |
| 2,537,516 | 1/1951 | Dawsey et al. | 23/207 |

*Primary Examiner*—Oscar R. Vertiz
*Assistant Examiner*—Hoke S. Miller
*Attorney*—Cushman, Darby and Cushman

[57] ABSTRACT

Hydrogen peroxide is prepared according to the anthraquinone process using as the solvent for the reaction carrier 5 to 95 percent of T-butyl benzene. Preferably the other solvent is a phosphate or phosphonate ester having a total of 12 to 27 carbon atoms in aryl or alkyl groups.

9 Claims, No Drawings

PROCESS FOR THE PRODUCTION OF HYDROGEN PEROXIDE

The present invention is directed to a process for the production of hydrogen peroxide according to the anthraquinone process using a new solvent mixture in the reaction carrier containing working solution.

Customarily in the anthraquinone process there is first dissolved in a solvent a quinone derivative, the reaction carrier, and the thus obtained working solution is hydrogenatd, in the presence of a catalyst e.g. with a palladium catalyst to such an extent that about 50 percent of the quinones are converted into the corresponding hydroquinones. In the oxidation step the hydroquinone solution is treated with an oxygen containing gas, e.g. air, whereby the quinone is reformed and simultaneously there is formed hydrogen peroxide which is washed out of the organic phase (working solution) with water. While the solution is returned to the hydrogenation step wherewith the cycle is closed and can be started anew, the aqueous extraction product (designated crude $H_2O_2$) accumulates in a concentration of about 15–35 weight percent and in the known process is for the most part so strongly impure (C content of 100–800 mg C/liter) with organic constituents that it must be further purified and, in a given case, concentrated before it is suitable for further reactions or can come into commerce. Both the working up of the crude $H_2O_2$ to a highly concentrated commercial product of good quality and also the purity of the working solution are closely tied to the quality of the crude $H_2O_2$ as will be shown subsequently. These factors cause an increase in the cyclic process expenditures whose cost in the calculation of the $H_2O_2$ total production price amounts to over 25 percent.

For this reason, many proposed processes have been made for improving the $H_2O_2$ quality, for avoiding decomposition of the working solution or for purification of the working solution. The previously proposed processes in the patent literature fall into three groups.

In the first group there are collected processes wherein it is proposed to bring the crude $H_2O_2$ accumulating in the extraction step to a high degree of purity and of a concentration customary in commerce by various measures. Examples of such measures are:

$H_2O_2$ purification with polyethylene, Cox, German patent 1,047,755;

$H_2O_2$ purification with an anion exchange resin, Freeland, British patent 924,625;

$H_2O_2$ purification with activated carbon, Elston, German Auslegeschrift 1,096,882;

$H_2O_2$ purification with waxes, Hauschild, German patent 1,108,196;

$H_2O_2$ purification and concentration by distillation (many patents).

In spite of the many proposals, until now no one has been able to obtain a dilute $H_2O_2$ of high purity or a $H_2O_2$ distillate of small C content with an expenditure that can be justified economically.

In the second group are collected processes which propose to insert into the cycle such working solution components that not only remain stable under the reaction conditions of the process for years in the cyclic process, but also have such a slight solubility in water or hydrogen peroxide that the production of a qualitatively high value crude $H_2O_2$ is guaranteed with them. The working solution inserted commercially in production plants of which a selection is collected in Table 1 fulfill the demands placed on them however, either insufficient or still not so perfect that still further improvements toward the above goals cannot be desired

TABLE 1
Composition of Working Solutions

| No. | German Patent or Auslegeschrift | Reaction Carrier | Vol. % Quinone Dissolvers | Vol. % Hydroquinone Dissolvers | Mg. C/l in 25% Crude $H_2O_2$ |
|---|---|---|---|---|---|
| 1 | 1,261,838 | ethyl-anthraquinone | 75 poly-alkyl-benzene | 25 tri-octyl phosphate | 68 |
| 2 | 1,112,051 | amyl-anthraquinone | 50 t-butyl-toluene | 50 disso-butyl carbinol | 171 |
| 3 | 953,790 | ethyl-anthraquinone | 50 tri-methyl benzene | 50 methyl cyclohexanol acetate | 285 |
| 4 | 888,840 | t-butyl-anthraquinone | 40 methyl naphthalene lene | 60 diiso-butyl carbinol | 205 |

As follows from the measurements whose results are also recorded in Table 1, the fresh working solution added in the cycling causes after about 20 cycles in the crude $H_2O_2$ produced the so-called "basic carbon value" which is explained by the solubility of the individual components in the crude $H_2O_2$. The height of the basic carbon value, moreover, is a measure for the usefulness of a working solution and already points to the difficulties to be expected in working up of the crude $H_2O_2$ product.

In the continuous recycling process of the working solution the amount of carbon containing impurities in the crude $H_2O_2$ increases steadily and there is obtained the so called total carbon content whose value in the longer recycling process can be four times as high as the basic carbon value. The phenomenon depends on the fact that degradation products which have a high solubility in the crude $H_2O_2$ are formed from the individual components of the working solution. The degradation is accomplished, for example, in the oxidation step of the cyclic process, where the working solution components are exposed to a constant gasification with an oxygen containing gaseous mixture at elevated temperature. This statement is correct for all previously known quinone dissolvers which are suited for an industrial insertion. Thus, there are formed from the quinone dissolvers named in Table 1 in the cycling the following oxidation products:

t-butyl toluene → t-butyl benzoic acid
methyl naphthalene → naphthol
alkyl benzenes → alkylated benzoic acid.

The hydroquinone dissolvers, which especially include alcohols and esters, show a similar formation in continuous cyclic operation; alcohols become oxidatively decomposed and esters become saponified and then further decomposed. The phosphate and phosphonate esters are an exception because they are relatively stable to saponification.

The degradation products of the working solution not only have a disadvantageous effect on the quality of the hydrogen peroxide produced, but cause in almost all process steps disturbances or undesired loss in yields, by which they, for example, reduce the productivity of the catalysts and regeneration agents added in the cycling or negatively influence important properties of the working solution (viscosity, surface tension, interfacial tension, density, distribution coefficient, etc.)

Therefore with the processes proposed in the third collected group, it has been proposed to keep the working solution at the original state of purity and to continuously remove the degradation products by, for example additional water washing of the working solution,
alkali washing of the working solution,
working up the working solution or inserting adsorption agents.

All known processes of groups 1–3, however, do not produce satisfactory results in all cases, above all in comparison with the high industrial and economic expense in the working up of the crude $H_2O_2$ product to a highly concentrated commercial product.

Surprisingly, it has now been found that there can be produced a low carbon crude $H_2O_2$ which also retains the small initial C value in long cycling of the working solution and can be further worked up without great expense to a highly concentrated $H_2O_2$ commerical product if the solvent mixture for the reaction carrier consists of 5 to 95 percent of t-butyl benzene and preferably contains at least 20 percent t-butyl benzene. An advantageous solvent combination is obtained if there is used t-butyl benzene as the quinone dissolver and phosphate or phosphonate esters as the hydroquinone dissolver. The named solvents produce the most favorable combination for manufacture of the reaction carrier containing working solution. However, there is also obtained in existing plants increased improvement if t-butyl benzene or the solvent combination of the invention is mixed with the previously known industrial solutions.

A working solution which contains the solvent of the mention makes it possible to accomplish the previously described requirements which otherwise are attainable only in a very troublesome manner and in economically expensive form by the processes proposed in groups 1–3 above.

With the combination of the invention, there is produced a crude $H_2O_2$ product in higher concentration and purity without employing special purification measures as are required by group 1 above.

The solvent combination of the invention is largely stable under the recycling conditions so that the formation of degradation products falls to very low values, as a result of which the activity of catalysts and regeneration agents added in the cycling remains for a longer time than was previously obtained and the physical data of the working solution are essentially unchanged. Finally, the quality of the hydrogen peroxide produced also remains unchanged so that the known process measures collected in groups 2 and 3 can be entirely or substantially given up.

The t-butyl benzene used as the quinone dissolver in the invention is an industrially readily available starting material and is not attacked in the recycling even under extreme reaction conditions. This statement is confirmed by the results of the tests compiled in example 1.

Even the phosphate esters (I) and the phosphonate esters (II) of the following constitution are today industrially readily available products:

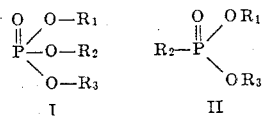

As suitable esters are those where $R_1$, $R_2$ and $R_3$ are alkyl and/or aryl. Preferably there are employed esters of aliphatic alcohols in which the total number of carbon atoms in the chain ($R_1 + R_2 + R_3$) lies between 12 and 27. At total C content below 12 the water solubility of the compound is too great as a result of which the distribution coefficient is impaired, on the other hand if the total C content is above 27, the density and viscosity of the ester increases so high that they are less well suited for use in the anthraquinone process. Especially preferred are aliphatic groups which either are straight chain or contain t-butyl groups.

Examples of suitable phosphates and phosphonates include trioctyl phosphate, triamyl phosphate, tri 2-ethylhexyl phosphate, tri t-butyl phosphate, diphenyl butyl phosphate, tributyl phosphate, triisobutyl phosphate, diphenyl octyl phosphate, diphenyl cresylphosphate, tricresyl phosphate, butyl diisoamyl phosphate, triisoamyl phosphate, tri sec. amyl phosphate, tri nonyl phosphate, tris decyl phosphate, trihexyl phosphate, triheptyl phosphate, dibutyl butane phosphonate, dioctyl methane phosphonate, dibutyl pentane phosphonate, di (t-butyl) pentane phosphonate, dipropyl hexane phosphonate, dipropyl heptane phosphonate, dibutyl heptane phosphonate, dibutyl octane phosphonate, dibutyl decane phosphonate, dioctyl octane phosphonate, diphenyl benzene phosphonate, diamyl benzene phosphonate.

The proportions of t-butyl benzene to phosphate ester or phosphonate ester can be within relatively wide boundaries if the named components make the sole solvent in the working solution. In that case, the hydroquinone dissolver (phosphate or phosphonate ester) should amount to 5–40 volume percent and the quinone dissolver (t-butyl benzene) 60–95 volume percent of the solvent mixture. The exact adjustment of the proportions in the mixture is arranged primarily according to the desired capacity of the working solution and the desired concentration of the crude $H_2O_2$ product. The preferred solvent mixture contains 70–85 volume percent of the quinone dissolver and 15–30 volume percent the hydroquinone dissolver.

With a working solution containing the solvent mixture of the invention can be produced a high $H_2O_2$ concentrate in the crude $H_2O_2$ product as set forth in Kabisch and Wittmann application 69,152 filed on even date and now abandoned and based on German priority application P 19 45 753.5, but also highly concentrated quality $H_2O_2$ can be produced which are equal to the customary $H_2O_2$ distillates that are burdened with a high industrial and economic expense for working up. The quality of the crude $H_2O_2$ product recovered according to the invention remains nearly unchanged, even in long recycling.

As reaction carriers for the working solution of the invention, there are suited all of the known quinone derivatives. Thus there can be used alkyl anthraquinones such as 2-ethyl anthraquinone, t-butyl anthraquinone, 2-isopropyl anthraquinone, 2-butyl anthraquinone, 2-sec-butyl anthraquinone, 1,3-diethyl anthraquinone, 2,3-diethyl anthraquinone, 1,4-diethyl anthraquinone, 2,7-diethyl anthraquinone and partially nuclear hydrogenated derivatives thereof such as 2-ethyl tetrahydroanthraquinone and 2-butyl tetrahydroanthraquinone.

Unless otherwise indicated, all parts and percentages are by weight.

EXAMPLE 1

In a gasification apparatus equipped with a gasification frit and an intensive reflux cooler there were gasified 1 liter each of different quinone dissolvers with 8 liters per hour of $O_2$ at a temperature of 140° C. During the experiments hourly samples were taken and the oxidation stability, among others, checked by measuring the peroxide content present. After the end of the test, the increase in density produced in the solvent by the $O_2$ attack was determined. The results obtained are set forth in Table 2.

Table 2
Oxidation Stability of Various Quinone Dissolvers

| Quinone Dissolver | Maximum Obtainable Peroxide Content | Density of the Quinone Dissolver $D_4^{20}$ Before Treatment | After Treatment |
|---|---|---|---|
| methyl naphthalene (No. 4 in Table 1) | after 1.5 hours 0.9 percent | 0.992 | 0.996 (after 20 hours) |
| polyalkyl-benzene (No. 1 in Table 1) | after 4 hours 7.5% (includes 10% t-butylbenzoic acid also) | 0.885 | 0.903 (after 4hours) |
| t-butyl toluene (No. 2 in Table 1) | after 48 hours 1.5% | 0.860 | after 48 hours 0.871 |
| trimethyl benzene (No. 3 in Table 1) | after 9 hours 8.5% | 0.876 | after 9 hours 0.896 |
| t-butyl benzene | after 48 hours 0.0% | 0.867 | after 48 hours 0.867 |

From Table 2 the superiority of t-butyl benzene, the quinone dissolver of the invention, in comparison to the customary industrial quinone dissolvers in regard to oxidation stability is clear.

EXAMPLE 2

A working solution was produced in which the solvent consisting of 80 volume percent t-butyl benzene and 20 volume percent triethylhexyl phosphate. In a liter of this solution there were dissolved 50 grams of 2-ethyl anthraquinone and 50 g. 2-ethyl tetrahydroanthraquinone. In the oxidizing step, which was carried out at 50° C., there was used air as the oxidizing agent in an amount to provide 5 % oxygen in the vent. In the hydrogenation step, the hydrogenation was carried out at 50° C. with hydrogen with the aid of a palladium on aluminum oxide (0.2 percent Pd) catalyst. In recycling of the working solution, a crude $H_2O_2$ was recovered in the extraction step of the process which had a $H_2O_2$ content of 42 weight percent on the average. In the first test weeks the carbon content amounted to 75 mg. C/l., after that increased gradually to a value of 90 mg. C/l and kept this value even in recycling the working solution for months. By water topping off (stripping) according to Kabisch application 68,977 filed on even date and now U.S. Pat. No. 3,714,342 and based on German priority application P 19 45 754.6, the crude $H_2O_2$ product was brought to a concentration of 60 weight percent in which the C content had a value of about 100 mg. C/l. In the constant recycling of this solution the residence time of the added palladium hydrogenation catalyst was improved about 55 percent while the consumption of the aluminum oxide added for regeneration purposes was cut in half. As comparison for the residence time and $Al_2O_3$ consumption, there were chosen the best of the working solutions under Table 1 (quinone dissolver polyalkyl benzenes).

EXAMPLE 3

There was produced a working solution in which the solvent consisted of 85 percent t-butylbenzene and 15 percent tri-n-amyl phosphate.x) In a liter of this solvent mixture there dissolved 27 grams of 2-ethyl anthraquinone and 63 grams of 2-ethyl tetrahydroanthraquinone. In the oxidizing step, which was carried out at 50° C., there was used as the oxidizing agent air in an amount to provide 5 percent oxygen in the vent. The hydrogenation was carried out at 50° C. with hydrogen using a palladium-aluminum oxide (0.2 percent Pd) catalyst. In the recycling of working solutions, there was recovered in the extraction step of the process a 27 percent crude $H_2O_2$ having a C content of 52 mg./l. The C content increased after three months recycling to 75 mg./l. and then remained constant. The residence time of the hydrogenation catalyst and regeneration agent were the same as in example 2. x) (% in volume)

What is claimed is:

1. In a process for the production of hydrogen peroxide by the anthraquinone process in which an alkyl anthraquinone or alkyl tetrahydroanthraquinone as the reaction carrier is alternately hydrogenated and oxidized the improvement comprising employing a solvent mixture for the reaction carrier comprising 5–95 percent by volume of t-butyl benzene as the quinone dissolver, said solvent mixture also including a member of the group consisting of (1) phosphate esters of the formula

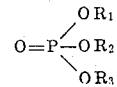

and (2) phosphonates of the formula

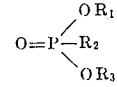

where $R_1$, $R_2$ and $R_3$ are aryl or alkyl as a hydroquinone dissolver.

2. A process according to claim 1 wherein the amount of t-butyl benzene is at least 20 percent by volume of the solvent mixture.

3. A process according to claim 1 wherein the solvent mixture is a mixture of t-butyl benzene with a member of the group consisting of (1) phosphate esters of the formula

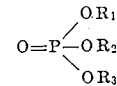

and (2) phosphonates of the formula

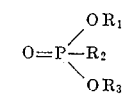

where $R_1$, $R_2$ and $R_3$ are aryl or alkyl and the sum of $R_1$, $R_2$ and $R_3$ is 12 to 27.

4. A process according to claim 3 wherein the t-butyl benzene is at least 20 percent by volume of the solvent mixture.

5. A process according to claim 4 wherein the solvent mixture contains 60 to 95 volume percent t-butyl benzene and 5 to 40 volume percent of the phosphate ester of formula (1).

6. A process according to claim 5 wherein the solvent mixture contains 70 to 85 volume percent t-butyl benzene and 15 to 30 volume percent of the phosphate ester.

7. A process according to claim 6 wherein the phosphate ester is selected from the group consisting of tri-n-amyl phosphate, tri-n-hexyl phosphate and tri-n-heptyl phosphate.

8. A process according to claim 5 wherein the phosphate ester is a trialkyl phosphate, each alkyl group containing 4 to 9 carbon atoms.

9. A process according to claim 8 wherein the alkyl groups are all n-alkyl groups.

* * * * *